United States Patent [19]

Teranishi

[11] 4,025,809
[45] May 24, 1977

[54] MASSAGING VIBRATOR

[75] Inventor: Akihiko Teranishi, Nagoya, Japan

[73] Assignee: Kabushiki Kaisha Teranishi Denki Seisakusho, Japan

[22] Filed: Mar. 8, 1976

[21] Appl. No.: 664,956

[30] Foreign Application Priority Data

Mar. 18, 1975 Japan .............................. 50-31783

[52] U.S. Cl. .................................... 310/81; 128/36
[51] Int. Cl.² ......................................... H02K 7/06
[58] Field of Search ............ 310/50, 81, 80; 128/36

[56] References Cited

UNITED STATES PATENTS

| 2,707,949 | 5/1958 | Sadlon | 128/36 |
| 2,892,108 | 6/1959 | Moxley | 310/81 |
| 3,671,785 | 6/1972 | Fuchs et al. | 310/81 X |

Primary Examiner—Donovan F. Duggan
Attorney, Agent, or Firm—George B. Oujevolk

[57] ABSTRACT

A massaging vibrator where the motor is coupled directly to the vibrating pad and eccentric counter balance weights are disposed on both sides of the motor.

6 Claims, 10 Drawing Figures

MASSAGING VIBRATOR

The present invention relates to a massaging vibrator and more particularly to a massaging vibrator where the motor is directly coupled to a vibrating pad.

BRIEF DESCRIPTION OF THE PRIOR ART

According to massaging vibrator now in use, i.e., devices of the prior art, the case including the handle is vibrated when the pad is pressed to desired body parts to cause the handle to turn. Therefore, it is necessary to use rotation checking material between the casing and the motor, also the handle is subjected to vibration caused by counteraction which makes the operator feel unpleasant and fatigued. The motor only built in the casing via a rotation stopper, and if the housing and the case body are made of the synthetic resin such material is weak due to the heavy weight of the motor, and reversely if those are built with metallic materials, then especial attention must be given to the electric insulation, though strength may be obtained. Further, in the conventional machine the terminal or lead wire conducting the electric current to the carbon brush is directly connected to the motor, and therefore since the lead wire is vibrated and at the same time it will be probably broken or dropped out from the connection. The built-in motor is merely a driving source for vibrating the vibrator, and the apparatus becomes complicated and bulky for transmitting movement. Notwithstanding, pressure to the body parts of a person should be strong to effect satisfying massage. Massaging is carried out by vibrating the pad through a crank shaft which is rotated in accordance with rotation of the motor. Useless vibrations are transmitted to the case body and to the handle causing vibration of the pad. The vibration in the moving direction of the balance weight provided on the crank shaft may be eliminated by rotation of a balance weight, but those caused in the other directions cannot be cancelled, so that the operator feel numb, asleep or shivers in the hand gripping the handle.

The relationship between the gripping hand and the handle is proportioned to the gripping power. Therefore vibration in the gripping direction is strongly felt, while vibration in the transverse direction is weak. However, the crank shaft with the balance weight extending from the motor is rotated together with the motor shaft, and vibration in the various directions caused by eccentric rotation of the crank shaft having the balance weight cannot be eliminated intthe crank shaft, or the motor shaft, though the vibration in the direction of the balance weight can be eliminated.

OBJECTS OF THE INVENTION

The invention has been devised to correct the foregoing shortcomings. A primary object of the invention is to cancel transmission of futile movement.

A second object of the invention is to prevent electrical danger by indirectly connecting a motor to an electric source.

A third object of the invention is to carry out massaging at low speed by soft gripping.

A fourth object of the invention is to cause complicated action on a pad to provide effective massaging.

Other features or advantages according to the invention will be better understood from the following description with reference to the accompanying drawings.

DETAILED DESCRIPTION OF THE INVENTION

Figure 10:
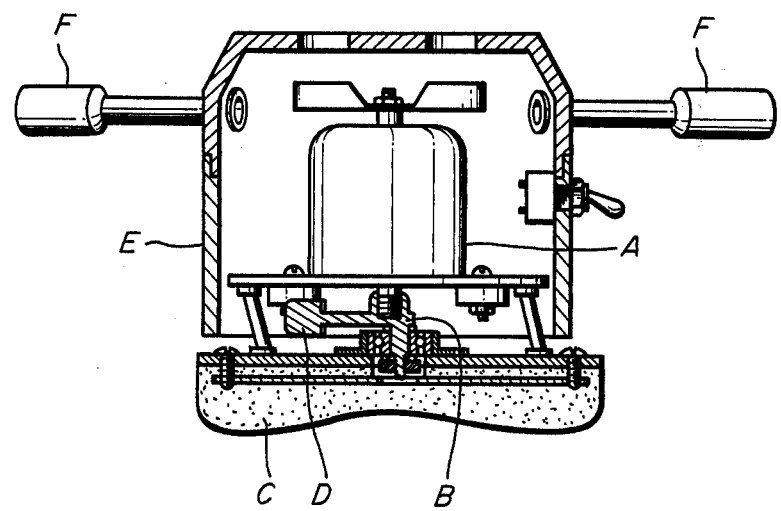
FIG. 10 is a cross section of the front part of the prior art device.

Shown in FIG. 10 is a massaging device of the prior art where massaging is done by vibrating the pad (C) through a crank shaft (B) rotated by motor (A). Useless vibrations are transmitted to the case body (E) and handle (F) in addition to the desired vibrations.

According to the inventive concept as shown in FIGS. 1, 4, 5, and 7, a motor 1 is pivoted to a machine frame via eccentric shafts 3 having balance weights 2, on both sides of the motor and one of the shafts 3 is provided with a fan 4 exhausting heat generated by the motor 1 through a hole 10 formed in a frame to obtain effective cooling. A case body 5 containing the motor 1 is composed of a case body 6 and frame 7, and a grip 8 of the case body 5 is shielded with a cover 9. Another grip 9' is furnished on the frame 7 at the opposite side to said grip 8.

Figure 1:
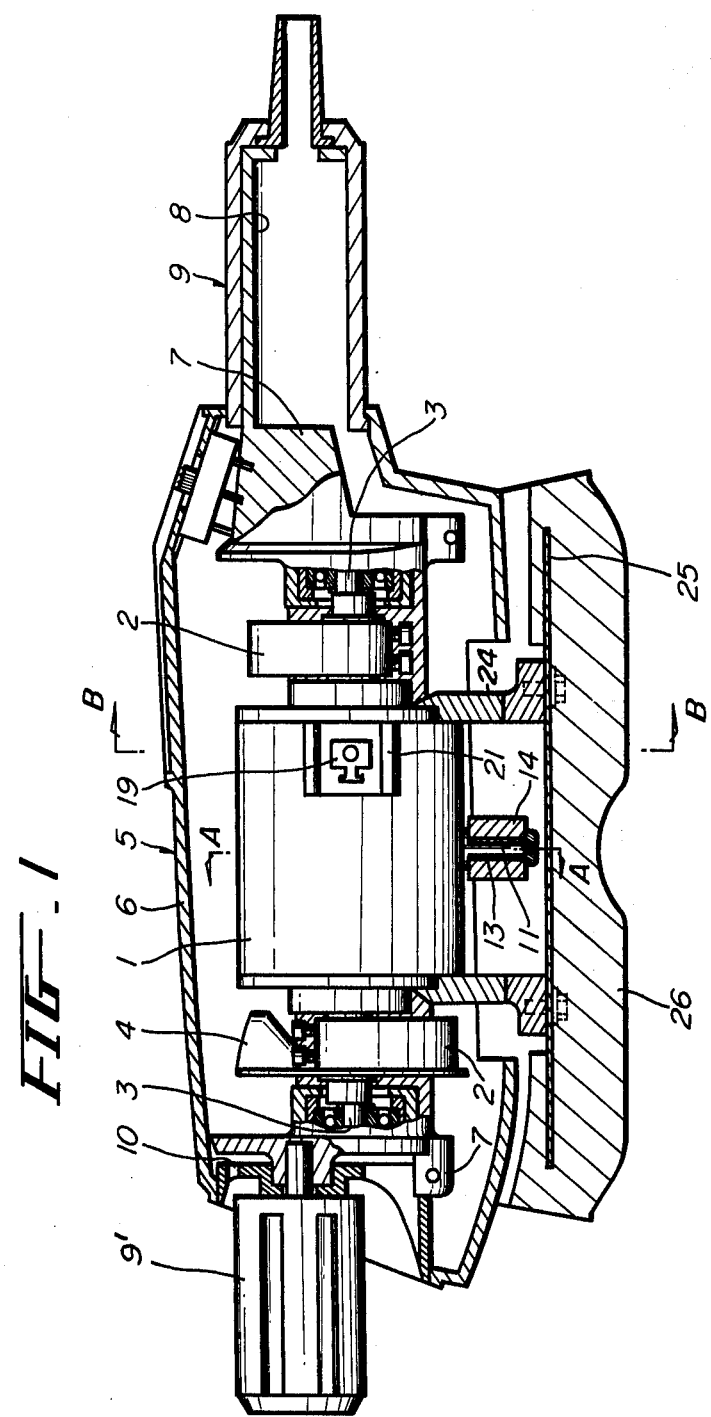
FIG. 1 is a cross section of a front part of an electric massaging vibrator according to the invention.
Figure 2:
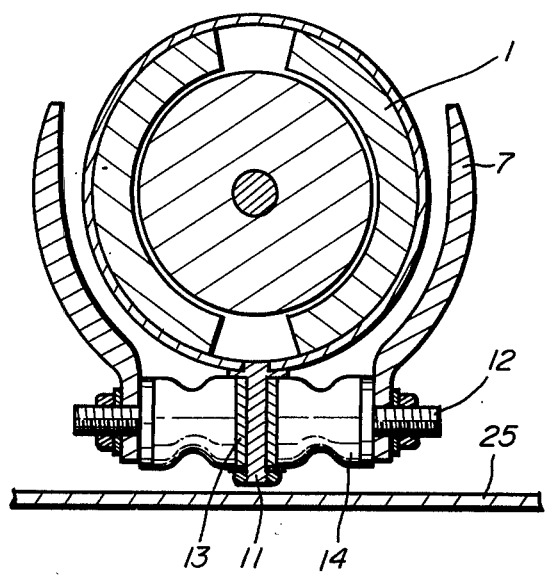
FIG. 2 is a cross section along line A — A of the above.

With reference to FIG. 2, the motor 1 is installed to the frame 7 in a manner that a motor supporter 11 extending from a center of the motor is fixed to a shaft 12 threaded into the frame 7 via a pipe 13 and elastic material 14 for preventing play in rotation of the motor without hindrance to vibration of the motor.

Figure 3:
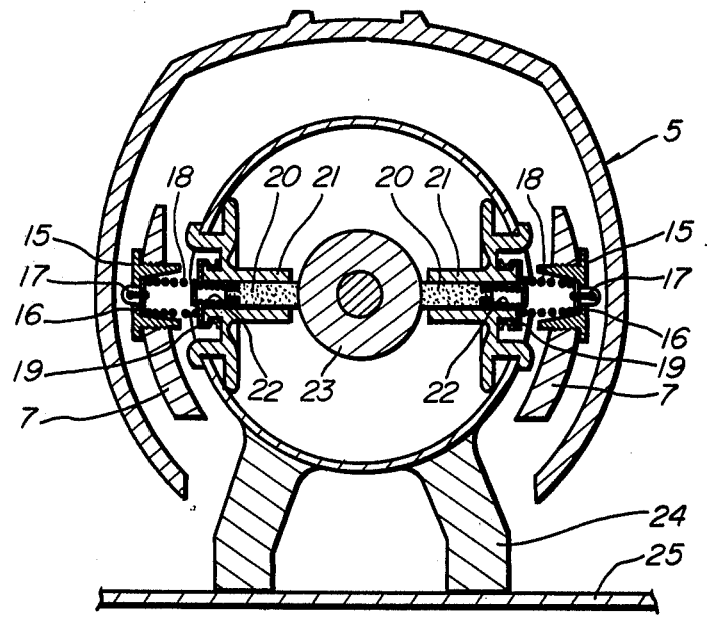
FIG. 3 is a cross section along line B — B of FIG. 1.

The electrical connection is shown in FIG. 3, in which a lead wire cap 15 formed with insulating material in the frame 7 is provided with an electric conductive terminal 16 having an electric lead wire 17, and a conductive spring 18 is intervened in a concave space defined by the leadwire cap to press a carbon brush presser 19 at the motor side. A carbon brush 20 playing in a carbon brush holder 21 is pressed to a rotor 23 by a spring 22. Motor feet 24 are secured to a pad plate 25 on which a pad 26 is supplied as one body.

Vibration caused by eccentric rotation by the motor 1 around the crank shafts 3 is reduced by the balance weights 2 which are provided eccentrically in opposite directions to the eccentricity of the crank shafts 3, so that vibration to the grip may be eliminated. On the other hand, vibration to the body parts of a person is relatively increased by providing the balance weights 2 on both sides of the crank shafts 3.

Figure 4:
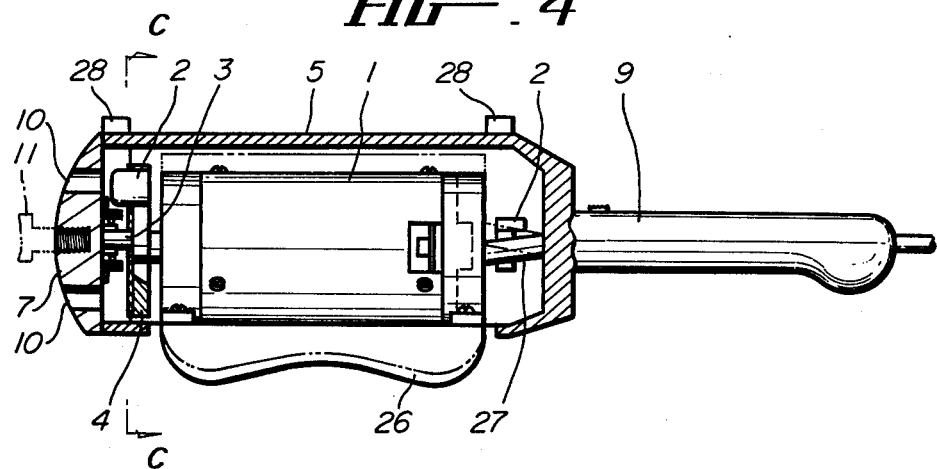
FIG. 4 is a cross section of a front part of a modification according to the invention.
Figure 5:
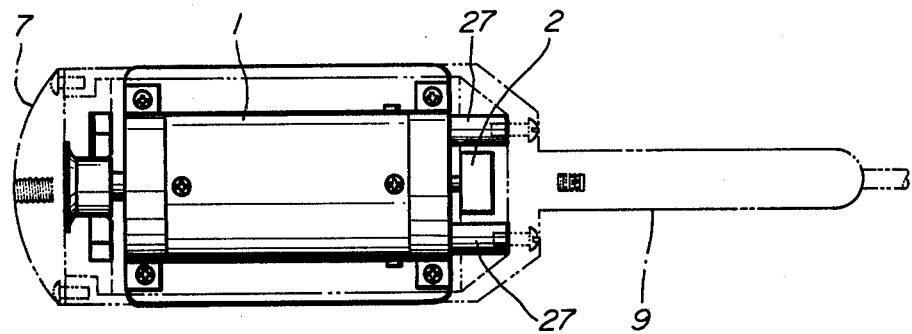
FIG. 5 is a plan view of FIG. 4.
Figure 6:
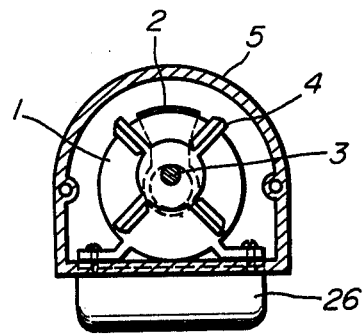
FIG. 6 is a cross section along line C — C of FIG. 4.

FIG. 4 to FIG. 6 depict a modification of the invention, in which the motor 1 is connected to the case body 5 via the crank shaft 3 at one part and the elastic material 27 at another part. This elastic material 27 causes the motor 1 to rotate smoothly while moderating vibration transmitted to the case body.

The elastic supporter 27 may be sufficient with either a single or plurality of units. The the two elastic supporters 27 are equipped as shown in FIG. 5, so that vibration caused by the motor 1 is reduced in twisting in the lateral direction in comparison with the single supporter, and vibration of the motor 1 is increased in the vertical direction. Feet 28 protrude on the case body 5.

Figure 7:
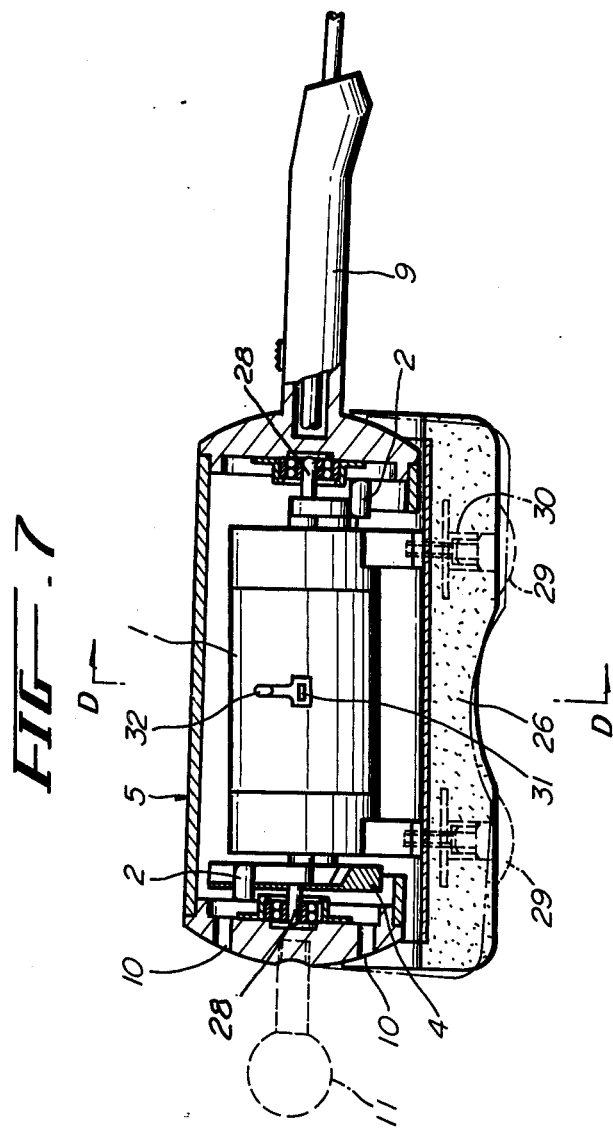
FIG. 7 is a cross section of a front part of another embodiment according to the invention.
Figure 8:
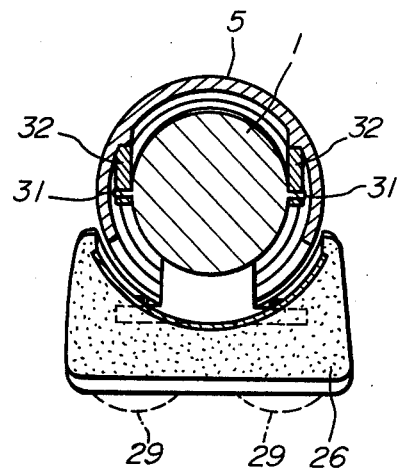
FIG. 8 is a cross section along line D — D of FIG. 7.
Figure 9:
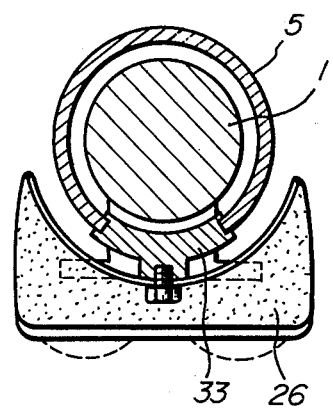
FIG. 9 is a cross section of a further embodiment according to the invention.

FIG. 7 and FIG. 8 show a third embodiment in which the motor 1 is attached to the case body 5 via right and left eccentric crank shafts 28 having the balance weights 2. In such a manner, vibration by the motor 1 is rich in various directions, since the balance weights are rotated around the center of the motor symmetrically in different directions, and since there are two crank shafts 28 and increase vibration, it is no longer necessary to provide a large scale apparatus to the driving mechanism, and thus the proposed device may be miniaturized.

Attachments 29 for auxiliary pad are attached to the vibrating pad 26 via screws 30 to obtain effectively local massaging, which is not limited to the bottom but also applied to the side.

Since the motor 1 is, as heretofore stated, supported at both sides by the crank shaft 28, and bearings formed in the case body 5, the case body 5 is vibrated when it is pressed to the body parts of a person and a rotation stopping projection 31 is provided at a position where vibration of the motor 1 is least, while a rotation stopper 32 formed with buffer material is furnished inside of the case body 5. Both are provided as shown in FIG. 8 to preferably remove idle by reaction of rotation of the motor 1 and the case body 5.

The motor 1 is supported at the position of the least vibration via elastic materials, so as to make vibration caused by the right and left crank shafts uniform in the both parts and to transmit vibrating movement smoothly. Thus, the hand and fingers do not feel numb as in the conventional massagers.

Further, since the lead wire is indirectly connected to the motor through the frame, the lead terminal fixed to the lead wire cap secured to the frame is not influenced by vibration of the motor even at high speed rotation, and the lead wire is always kept stable without breaking the lead wire or dropping out the terminal.

The vibrating pad for massaging is directly provided to the motor, and the both are vibrated together. The broad pad added with the motor weight is effective for massaging the body with less pressure and at lower speed of rotation than in the conventional case. Besides, owing to the low speed ratation, vibration to the grip is less, and since the pad is coupled to the motor, the complicated transmitting mechanism is not necessary.

Vibration in the acting direction of the balance weights is reduced by the balance weights. Vibrations in the other directions are modified to act in the lateral direction by making use of the characteristic that the grip and the hand are proportional to the griping power by means of the grip which is provided coaxlly with the crank shaft connecting the motor to the vibrating pad.

In such a way, vibration to the hand is considerably reduced without feeling numb, or shivering.

As the motor is stably supported to the frame and the case body is sufficient only for protecting the motor and the frame, the most suitable type may be selected preferably for production. The grip may be covered with appropriate materials such as synthetic resin or rubber, since vibration to the grip is lesser. In addition, the case body may have another spare grip which is useful for massaging the shoulders, and waist where operation is difficult by one hand.

I claim:

1. In a massaging vibrator device wherein massaging is done by a vibrating pad (26) attached to a pad plate (25) when said pad (26) is applied to a human body, said massaging vibrator having a longitudinal case and frame (5, 7) with grip means (8, 9) extending longitudinally out of said case and frame, with a motor (1) having output ends disposed in said case body and frame and longitudinal crank shaft means (3) coupling the motor output ends to the frame, the improvement therein including:
   a. first and second eccentric balance weight means (2) disposed on said crank shaft means (3) at said motor output ends said eccentric balance weight means (3) being disposed in opposed phase, and,
   b. pad coupling means (24) between said motor (1) and said pad plate (25) directly coupling the motor to the pad, whereby said eccentric balance weight means cause the motor and coupled pad to vibrate.

2. A device as claimed in claim 1 including a motor support shaft (12), adjacent said pad plate (25), supported by said frame (7); a motor center section, on said motor (1), with a motor supporter (11), extending from said motor center section to said support shaft (12); pipe coupling means (13), coupling said motor supporter (11) and said shaft (12); and, elastic material (14) on said shaft (12) between said frame (7) and said pipe coupling means (13).

3. A device as claimed in claim 1, including a motor rotor (23), a lead wire cap (15) in said frame (7) adjacent said motor (1) said cap (15) having an inner section facing said motor, a conductive terminal (16) in said inner section with a lead wire (17), a conductive spring (18) in said inner section coupled to said terminal (16), a brush presser on said motor opposite said inner section, a brush holder (21) on said motor for holding a carbon brush (20) therein, spring means (22) in said brush holder (21) for biasing brushes in said brush holder (21) onto said rotor (23); and, said pad coupling means (24) comprising a motor foot (24) extending from said motor to said pad plate (25).

4. A device as claimed in claim 1 wherein said crank shaft means (3) includes elastic material (27) between one motor output end and said case and frame (5, 7).

5. A device as claimed in claim 1 wherein said eccentric balance weight means (3) consists of eccentric weight pieces.

6. A device as claimed in claim 1 wherein said eccentric balance weight means consists of identical weight pieces mounted on eccentric shafts of opposed phase.

* * * * *